B. & D. H. HARNISH.
LAWN MOWER.
No. 112,338. Patented Mar. 7, 1871.
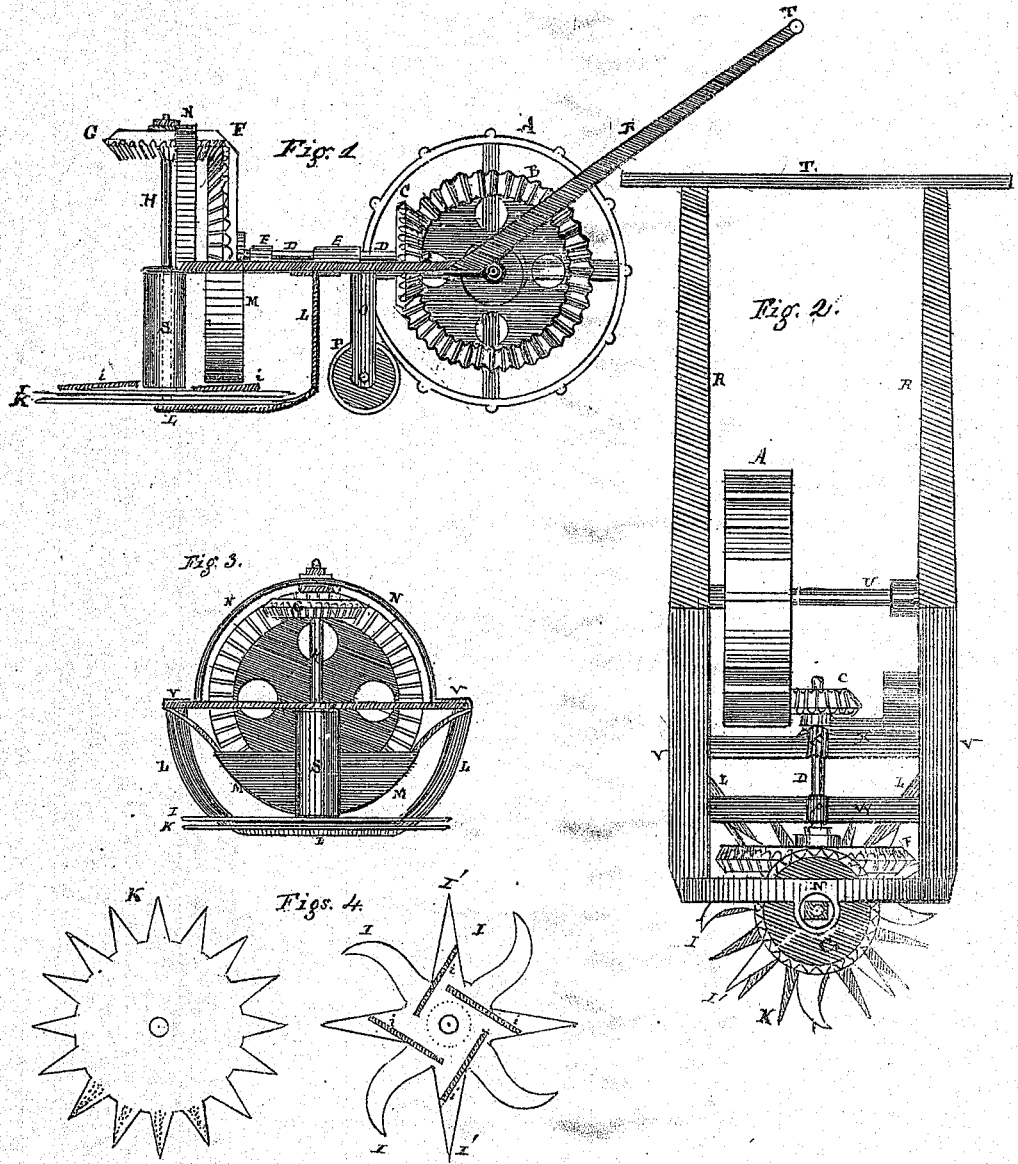
Witnesses.
Wm B. Uhler
Jacob Stauffer
Inventors.
B. Harnish
D. H. Harnish

United States Patent Office.

BENJAMIN HARNISH, OF LANCASTER, AND DAVID H. HARNISH, OF PEQUEA, PENNSYLVANIA.

Letters Patent No. 112,338, dated March 7, 1871.

IMPROVEMENT IN LAWN-MOWERS.

The Schedule referred to in these Letters Patent and making part of the same.

We, BENJAMIN HARNISH, of Lancaster city, and DAVID H. HARNISH, of Pequea, in the county of Lancaster and State of Pennsylvania, have jointly invented certain Improvements in Hand Mowing-Machines, of which the following is a specification.

The nature of our improvement consists in the employment of two kinds of sickles affixed to a circular disk, alternately made bill-hooked and straight-edged or star-pointed, with a cutting-edge on both sides of the blades, if preferred, in order to cut with equal facility in pulling back the machine. These sickles, say four of each, are made to revolve with a high speed horizontally over and in close contact with a circular fixed disk, which has radiating guards, star-pointed, keeled, and provided with shear or cutting-edges.

To prevent clogging and to facilitate clearing, a loose rather wide cylinder surrounds the vertical shaft; tangential beaters across the sickles, in combination with the arrangement of the gearing-frame and pushing-handles.

The accompanying drawing will illustrate the construction and arrangement, in which—

Figure 1 is a side elevation.
Figure 2, a top or plan view.
Figure 3, a front view.
Figure 4 shows the radiating star-pointed guards, detached from the revolving two-fold sickle-blades, showing the position of the beaters.

A brief description will enable any one skilled in the art to make and use our invention.

The handle-supports R R are raised upward from the horizontal sides V V, and terminated by the cross-piece or handle proper T.

Each of the sides V is supported by a pulley-wheel, P, suspended in a bracket, O, which keeps the front arrangement from contact with the ground.

The traction-wheel A is of the ordinary construction.

The axle U has its boxes or bearings beneath the junction of the handle-supports and sides R R and V V.

On the axle, and connected with the traction-wheel A, is a beveled cog-wheel, B, which drives a beveled pinion, C, on the end of the horizontal shaft D, which has boxes E E on the cross-pieces W X, from V to V.

On the forward end of said shaft D is a beveled cog-wheel, F, which gives motion to the pinion G on a vertical shaft, H, having its step in the hanger L or combined disk of the star-pointed guards K, supported by the hanger.

This shaft H is supported above in the arched band or plate N, with nut and washer, and centrally in the front cross-piece from V to V to the lower end of this shaft is the disk, with its two kinds of radiating sickles, I I', alternately made bill-hooked and star-pointed. In order to cut also when drawn back the sickles are sharp on both edges.

To prevent the lodgment of the cut grass tangential beaters $i\ i\ i\ i$ are placed on the sickles in the manner shown in fig. 4.

To prevent any grass from interfering with the motions of the shaft a loose sleeve or cylinder, S, surrounds it, and rests on the disk of the sickles. The eccentric motion and looseness readily unwind and relax the grass that might clog, and dislodge it.

The sectional case M prevents any grass from clogging the beveled wheel F.

The radiating star-pointed guards in a circle, K, fig. 4, are centrally keeled beneath, with shear-like cutting-edges on both sides.

This combined arrangement, on several trials had, promises to render full satisfaction for a hand-mower in yards and lawns, where the soil is level and free from stones.

We are aware that revolving sickles of various construction have been tried years ago and rejected, but we are not aware that they were ever used alternately bill-hooked and star-pointed, in combination with tangential beaters and loose cylinder, together with the circular-radiating star-pointed guards, with their cutting-edges as shown.

What we claim as our invention, and desire to secure by Letters Patent, is—

1. The arrangement and combination, in a hand-mower, of alternate bill-hooked and star-pointed sickles I I', with their beaters $i\ i\ i\ i$, revolving horizontally over a circular row of radiating guards K, sustained by hangers L, in the manner specified.

2. In combination with the central disk and beaters $i$, the loose cylinder S surrounding the shaft H, when resting on the sickle-disk, in manner and for the purpose set forth.

B. HARNISH.
D. H. HARNISH.

Witnesses:
   W. B. WILEY,
   JACOB STAUFFER.